(12) United States Patent
Sakaguchi et al.

(10) Patent No.: US 11,112,007 B2
(45) Date of Patent: Sep. 7, 2021

(54) SHIFT RANGE SWITCHING SYSTEM

(71) Applicant: DENSO CORPORATION, Kariya (JP)

(72) Inventors: Koji Sakaguchi, Kariya (JP); Taku Ito, Kariya (JP); Haruka Miyano, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/867,850

(22) Filed: May 6, 2020

(65) Prior Publication Data

US 2020/0263790 A1 Aug. 20, 2020

Related U.S. Application Data

(63) Continuation of application No. PCT/JP2018/042422, filed on Nov. 16, 2018.

(30) Foreign Application Priority Data

Nov. 20, 2017 (JP) .............................. JP2017-222865

(51) Int. Cl.
*F16H 61/32* (2006.01)
*F16H 61/12* (2010.01)

(52) U.S. Cl.
CPC ............. *F16H 61/32* (2013.01); *F16H 61/12* (2013.01); *F16H 2061/126* (2013.01); *F16H 2061/1216* (2013.01); *F16H 2061/323* (2013.01)

(58) Field of Classification Search
CPC .. F16H 61/32; F16H 61/12; F16H 2061/1216; F16H 2061/126; F16H 61/323
See application file for complete search history.

(56) References Cited

U.S. PATENT DOCUMENTS

| 6,866,611 | B2* | 3/2005 | Tsuzuki | F16H 59/105 |
| | | | | 475/119 |
| 10,309,533 | B2* | 6/2019 | Kamada | F16H 63/3466 |
| 10,436,316 | B2* | 10/2019 | Yang | F16H 61/12 |
| 10,690,243 | B2* | 6/2020 | Noto | F16H 61/32 |
| 10,844,954 | B2* | 11/2020 | Kamio | B60W 10/11 |
| 10,871,223 | B2* | 12/2020 | Kamio | H02P 25/16 |
| 10,890,250 | B2* | 1/2021 | Terai | F16H 61/702 |
| 10,935,132 | B2* | 3/2021 | Kwon | F16H 63/32 |

(Continued)

FOREIGN PATENT DOCUMENTS

| JP | 2012-212388 | 11/2012 |
| JP | 2016-94949 | 5/2016 |
| JP | 2017-150618 | 8/2017 |

*Primary Examiner* — David M Fenstermacher
(74) *Attorney, Agent, or Firm* — Nixon & Vanderhye P.C.

(57) ABSTRACT

A shift range switching system includes: a motor that includes motor windings and generates a cogging torque by a permanent magnet; drive circuits; an output shaft; a shift range switching mechanism that includes a trough providing member with troughs and crests and integrally rotates with the output shaft, an engagement member that fits in one trough corresponding to a shift range, and an urging member that urges the engagement member toward one trough; and a control unit with one calculation unit. The engagement member drops into one trough with an allowance. When an abnormality occurs in motor drive systems in an ascending action in which the engagement member moves from one trough toward one crest, the shift range switching systems avoids an occurrence of an intermediate range stop abnormality.

10 Claims, 12 Drawing Sheets

(56) References Cited

U.S. PATENT DOCUMENTS

| | | | |
|---|---|---|---|
| 10,941,860 B2* | 3/2021 | Kamio | F16H 61/26 |
| 10,948,078 B2* | 3/2021 | Kamio | F16H 61/12 |
| 10,962,105 B2* | 3/2021 | Saeki | F16H 61/0403 |
| 11,009,123 B1* | 5/2021 | Oh | F16H 61/061 |
| 2004/0008002 A1* | 1/2004 | Kamio | H02P 6/12 |
| | | | 318/701 |
| 2004/0066166 A1* | 4/2004 | Nakai | F16H 61/32 |
| | | | 318/701 |
| 2005/0174084 A1* | 8/2005 | Nakai | F16H 61/32 |
| | | | 318/632 |
| 2010/0256880 A1* | 10/2010 | Sato | F16H 59/105 |
| | | | 701/55 |
| 2012/0283066 A1* | 11/2012 | Nakade | F16H 61/12 |
| | | | 477/79 |
| 2015/0000449 A1 | 1/2015 | Sakaguchi et al. | |
| 2015/0222211 A1* | 8/2015 | Maruo | H02P 23/0027 |
| | | | 318/612 |
| 2016/0102761 A1 | 4/2016 | Kuwahara et al. | |
| 2016/0215880 A1 | 7/2016 | Kinoshita | |
| 2020/0263790 A1 | 8/2020 | Sakaguchi et al. | |

* cited by examiner

US 11,112,007 B2

SHIFT RANGE SWITCHING SYSTEM

CROSS REFERENCE TO RELATED APPLICATION

The present application is a continuation application of International Patent Application No. PCT/JP2018/042422 filed on Nov. 16, 2018, which designated the U.S. and claims the benefit of priority from Japanese Patent Application No. 2017-222865 filed on Nov. 20, 2017. The entire disclosures of all of the above applications are incorporated herein by reference.

TECHNICAL FIELD

The present disclosure relates to a shift range switching system.

BACKGROUND

Conventionally, a shift device has been known which switches a shift range by controlling a motor in response to a shift range switching request from a driver. For example, in a conceivable technique, the position of a trough bottom is learned by use of a predetermined amount of backlash provided between two intermediate gears.

SUMMARY

According to an example embodiment, a shift range switching system includes: a motor that includes motor windings and generates a cogging torque by a permanent magnet; drive circuits; an output shaft; a shift range switching mechanism that includes a trough providing member with troughs and crests and integrally rotates with the output shaft, an engagement member that fits in one trough corresponding to a shift range, and an urging member that urges the engagement member toward one trough; and a control unit with one calculation unit. The engagement member drops into one trough with an allowance. When an abnormality occurs in motor drive systems in an ascending action in which the engagement member moves from one trough toward one crest, the shift range switching systems avoids an occurrence of an intermediate range stop abnormality.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
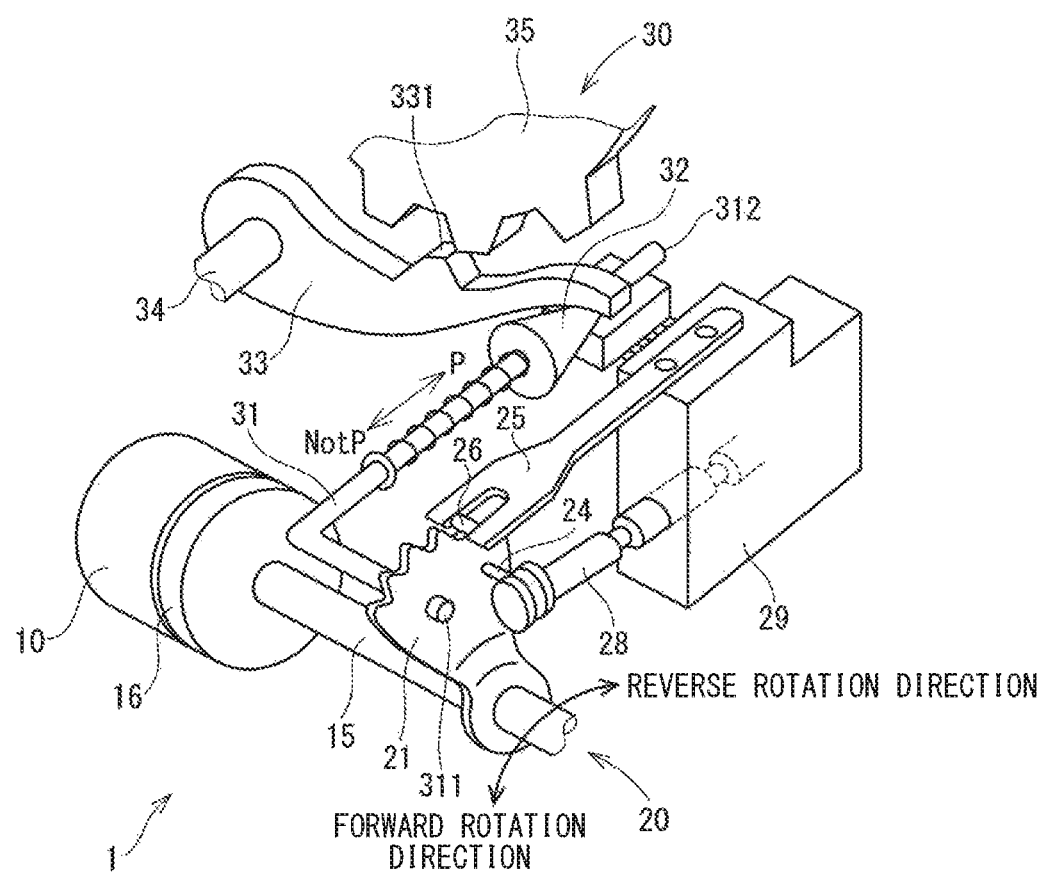
FIG. 1 is a perspective view showing a shift-by-wire system according to a first embodiment.

In a conceivable technique, an urging force of a detent spring is a force that acts so that a roller portion falls into a trough. In the shift range switching system, when the range is switched, a state in which a spring load acts in a direction to assist a motor torque and a state in which the spring load acts in a direction to prevent the motor torque repeatedly occur as the roller portion moves along the troughs and troughs.

When a motor in which a cogging torque is generated is used as the driving source, a torque balance point is generated at which the load torque caused by the spring load and the torque caused by the cogging torque, the motor friction, and the like are balanced. In this example, a new problem has been found that when a motor-off failure that the motor cannot be driven occurs during switching of a shift range, the torque is balanced depending on a motor position at the time of occurrence of the motor-off failure, and an output shaft stops in an intermediate range. If the output shaft stops in the intermediate range, an appropriate hydraulic pressure cannot be generated in an automatic transmission, which may lead to a failure of the automatic transmission.

In view of the above points, a shift range switching system is provided to be capable of continuing the driving of a motor even when an abnormality occurs in a part of a motor drive control systems.

The shift range switching system according to an example embodiment includes a motor, a drive circuit, an output shaft, a shift range switching mechanism, and a control unit. The motor has motor windings and a cogging torque is generated by permanent magnets. The drive circuit switches the energization of the motor windings. The rotation of a motor shaft, which is a rotation shaft of the motor, is transmitted to the output shaft. The shift range switching mechanism includes a trough providing member, an engagement member, and an urging member. The trough providing member is formed with multiple troughs and multiple crests separating the troughs, and rotates integrally with the output shaft. The engagement member fits into the trough corresponding to a shift range. The urging member urges the engagement member in a direction to fit in the trough. The control unit includes a calculation unit that performs calculation relating to a drive control of the motor.

An allowance is provided between the motor shaft and the output shaft, and the engagement member can be dropped into the trough by use of the allowance. The drive circuit, the motor winding, the connection wiring connecting the drive circuit and the motor winding, and the calculation unit are used as a motor drive control system. The multiple motor drive control systems are provided to avoid the occurrence of an intermediate range stop abnormality in which the output shaft stops due to the balance of an output shaft cogging torque, which is a cogging torque transmitted to the output shaft, and a torque including a load torque of an urging member, when an abnormality occurs in a motor drive control system during ascending in which an engagement member is moving from a trough to a crest.

As a result, even when an abnormality occurs in a part of the motor drive control systems during ascending of the engagement member, the driving of the motor can be continued, and the intermediate range stop abnormality is avoided, so that a failure of the automatic transmission can be prevented.

Hereinafter, a shift range switching system will be described with reference to the drawings. Hereinafter, in multiple embodiments, substantially the same components are denoted by the same reference numerals, and a description of the same configurations will be omitted.

First Embodiment

Figure 2:
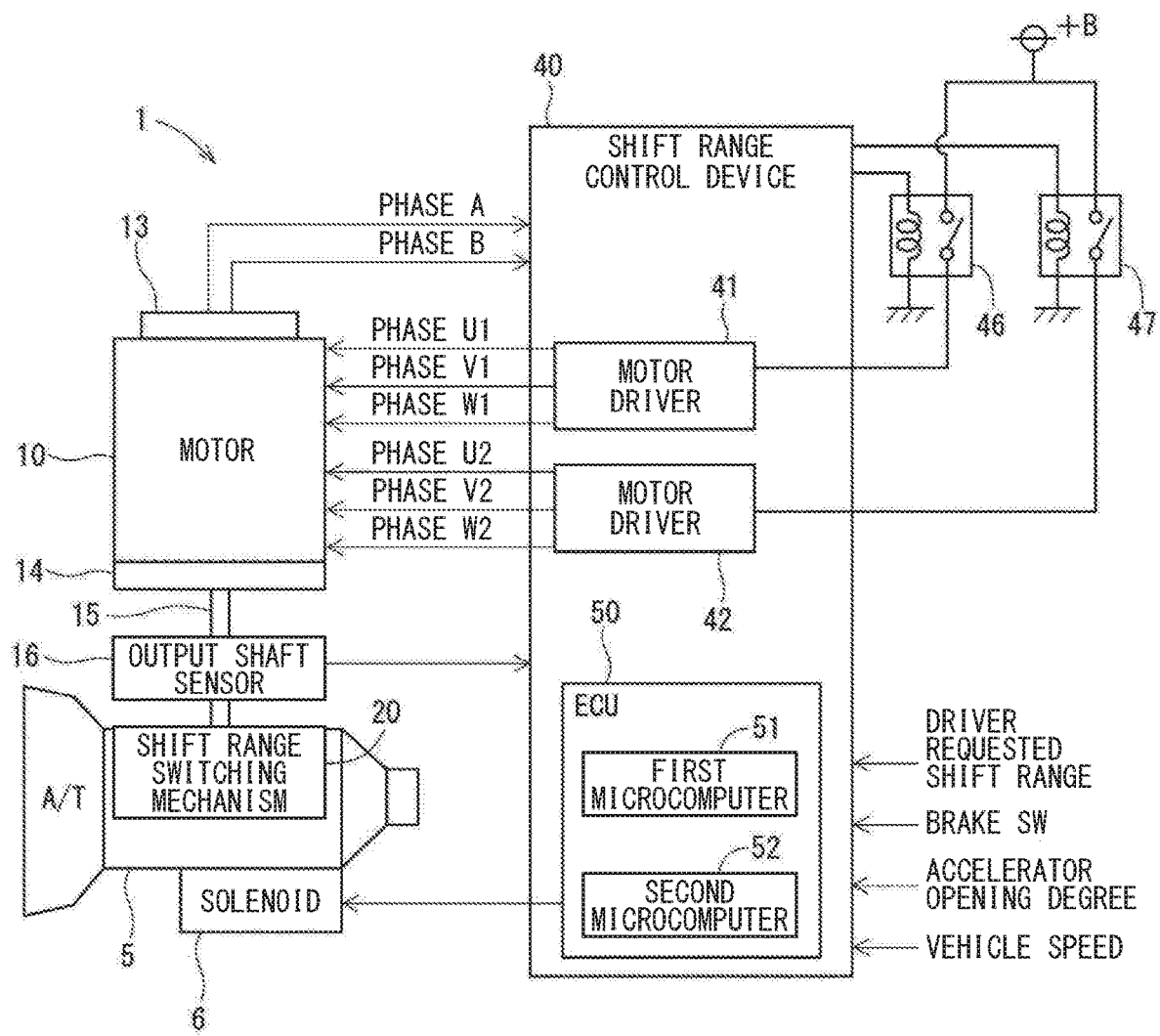
FIG. 2 is a schematic configuration diagram showing a shift-by-wire system according to the first embodiment.

FIGS. 1 to 10 show a shift range control device according to a first embodiment. As shown in FIGS. 1 and 2, a shift-by-wire system 1 as a shift range switching system includes a motor 10, a shift range switching mechanism 20, a parking lock mechanism 30, a shift range control device 40, and the like.

The motor 10 rotates when an electric power is supplied from a battery 45 (see FIG. 3) mounted on a vehicle (not shown), and functions as a driving source of the shift range switching mechanism 20. The motor 10 according to the present embodiment is a DC brushless motor of a permanent magnet type, and generates a cogging torque. In the present specification, the cogging torque and a torque caused by a motor friction and the like, which are generated even at the time of deenergization, are appropriately referred to as a "motor cogging torque".

Figure 3:
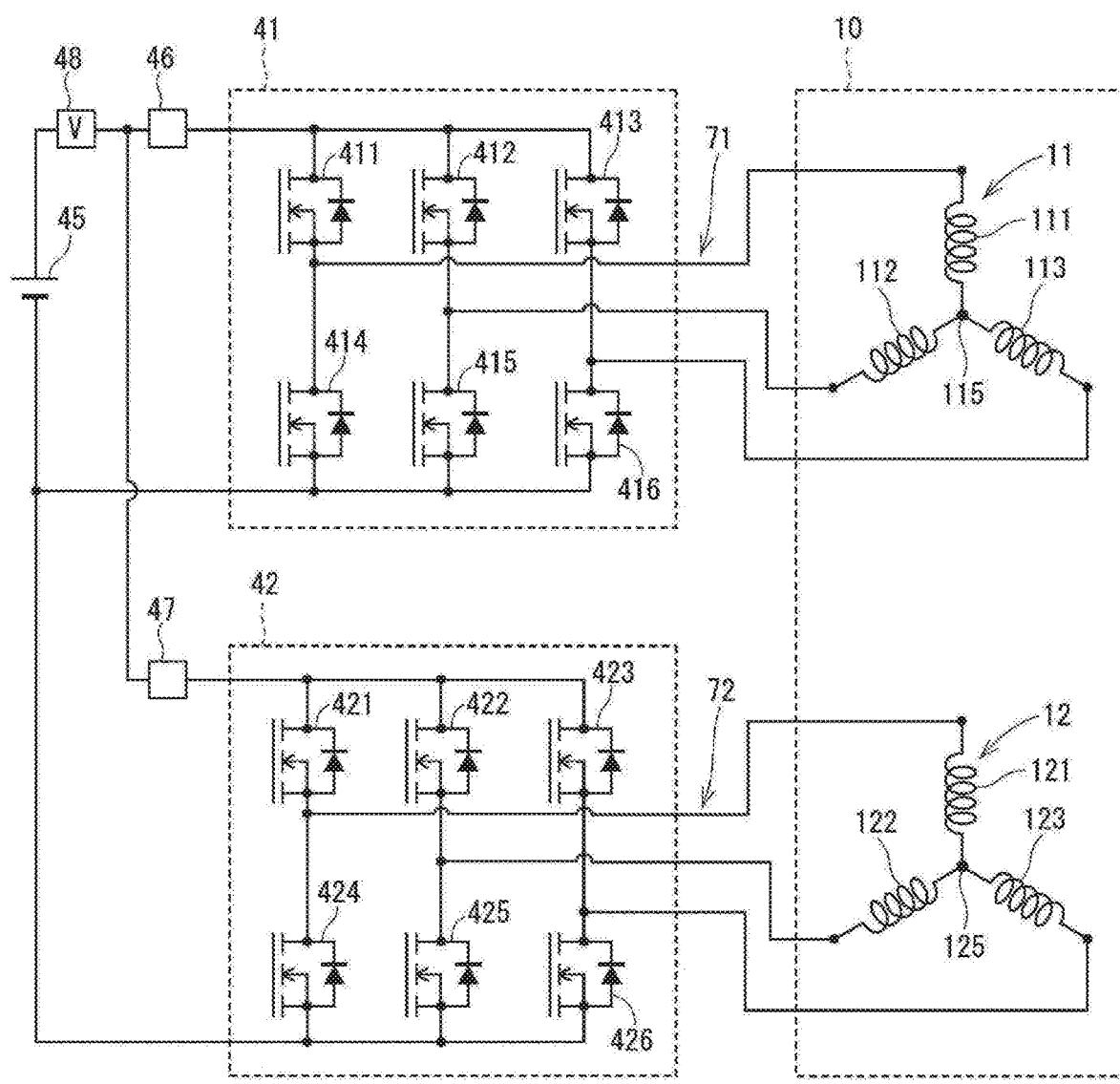
FIG. 3 is a circuit diagram showing a motor and a motor driver according to the first embodiment.

As shown in FIG. 3, the motor 10 has two sets of motor windings 11 and 12. The first motor winding 11 includes a U1 coil 111, a V1 coil 112, and a W1 coil 113. The second motor winding 12 includes a U2 coil 121, a V2 coil 122, and a W2 coil 123.

As shown in FIG. 2, an encoder 13 detects a motor angle $\theta m$, which is a rotational position of a rotor (not shown) of the motor 10. The encoder 13 is, for example, a magnetic rotary encoder, and includes a magnet that rotates integrally with the rotor, a Hall IC for magnetic detection, and the like. The encoder 13 outputs pulse signals of the A-phase and the B-phase at every predetermined angle in synchronization with the rotation of the rotor.

A speed reducer 14 is provided between the motor shaft 105 (see FIG. 4), which is a rotation shaft of the motor 10, and an output shaft 15, and reduces a rotation speed of the motor 10 to output the rotation of the motor 10 to the output shaft 15. As a result, the rotation of the motor 10 is transmitted to the shift range switching mechanism 20. The output shaft 15 is provided with an output shaft sensor 16 for detecting an output shaft angle $\theta s$ which is an angle of the output shaft 15. The output shaft sensor 16 is, for example, a potentiometer. In the embodiment, an allowance such as a gear backlash exists between the motor shaft 105 and the output shaft 15. Hereinafter, as appropriate, a total allowance between the motor shaft 105 and the output shaft 15 is referred to as "backlash".

As shown in FIG. 1, the shift range switching mechanism 20 includes a detent plate 21, a detent spring 25, and the like, and transmits a rotational driving force output from the speed reducer 14 to a manual valve 28 and the parking lock mechanism 30.

The detent plate 21 is fixed to the output shaft 15 and driven by the motor 10. The detent plate 21 is provided with a pin 24 projecting parallel to the output shaft 15. The pin 24 is connected to a manual valve 28. When the detent plate 21 is driven by the motor 10, the manual valve 28 reciprocates in the axial direction. In other words, the shift range switching mechanism 20 converts a rotational motion of the motor 10 into a linear motion and transmits the linear motion to the manual valve 28. The manual valve 28 is provided in the valve body 29. When the manual valve 28 reciprocates in the axial direction, a hydraulic supply path to a hydraulic clutch (not shown) is switched, and an engagement state of the hydraulic clutch is switched, to thereby change the shift range.

Figure 5:
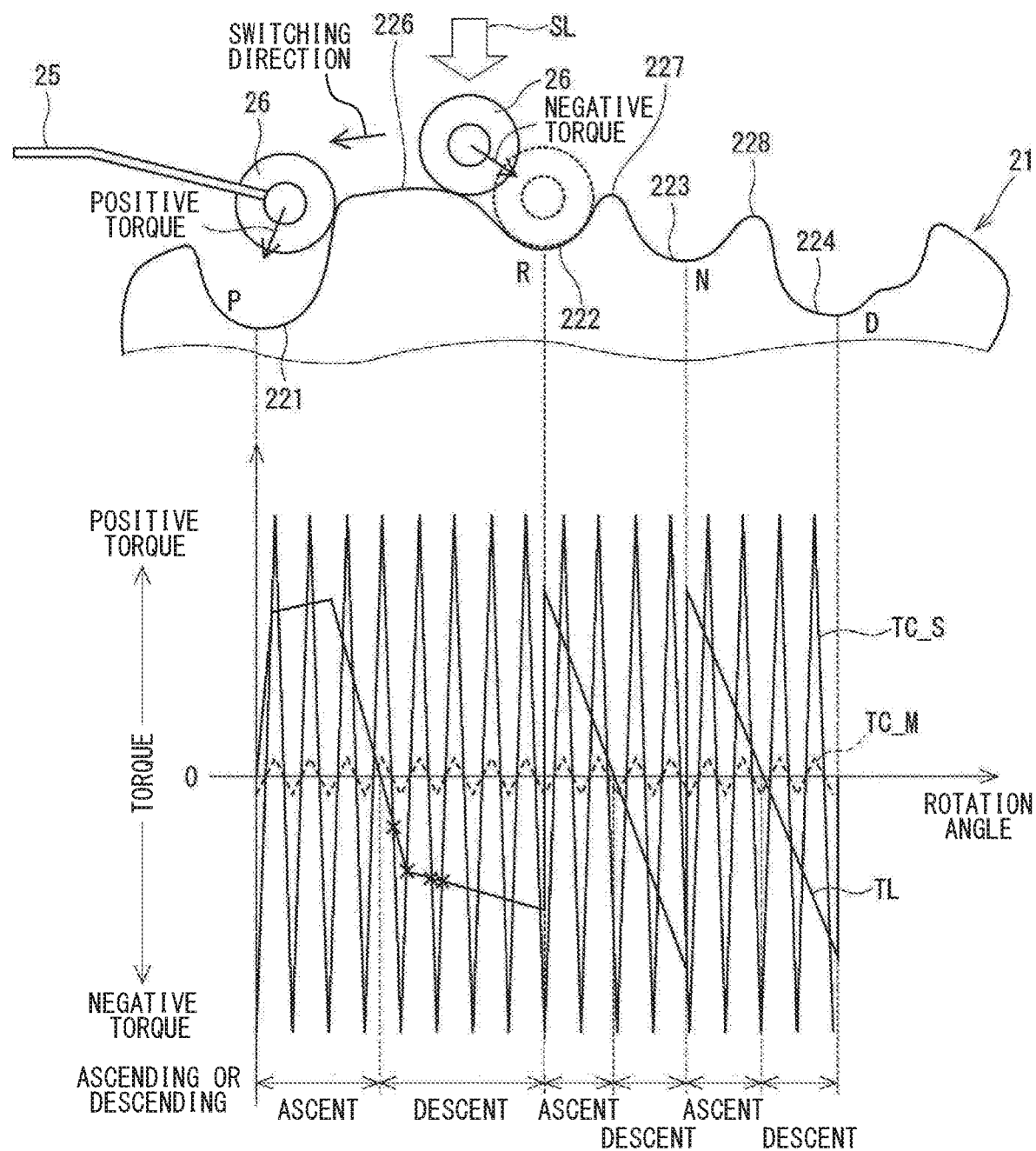
FIG. 5 is an illustrative diagram illustrating a torque applied to the detent mechanism according to the first embodiment.

As shown in FIGS. 1 and 5, four troughs 221 to 224 for holding the manual valve 28 at positions corresponding to respective ranges are provided on the detent spring 25 side of the detent plate 21 which is a trough providing member. The troughs 221 to 224 are arrayed in the order of a P trough 221 corresponding to a P (parking) range, an R trough 222 corresponding to an R (reverse) range, an N trough 223 corresponding to an N (neutral) range, and a D trough 224 corresponding to a D (drive) range from a tip side of the detent spring 25.

The detent spring 25, which is an urging member, is an elastically deformable plate-like member, and a detent roller 26, which is an engagement member, is provided at a tip of the detent spring 25. The detent spring 25 urges the detent roller 26 toward the center of rotation of the detent plate 21. When a predetermined or more rotating force is applied to the detent plate 21, the detent spring 25 elastically deforms, and the detent roller 26 moves on the troughs 221 to 224. For example, when switching from the P range to the D range, the detent roller 26 moves from the P trough 221 to the D trough 224 while rotating the detent plate 21 in the forward rotation direction, and fits in the D trough 224. When the detent roller 26 fits into one of the troughs 221 to 224, the swinging of the detent plate 21 is regulated, the axial position of the manual valve 28 and the state of the parking lock mechanism 30 are determined, and the shift range of the automatic transmission 5 is fixed.

Figure 6:
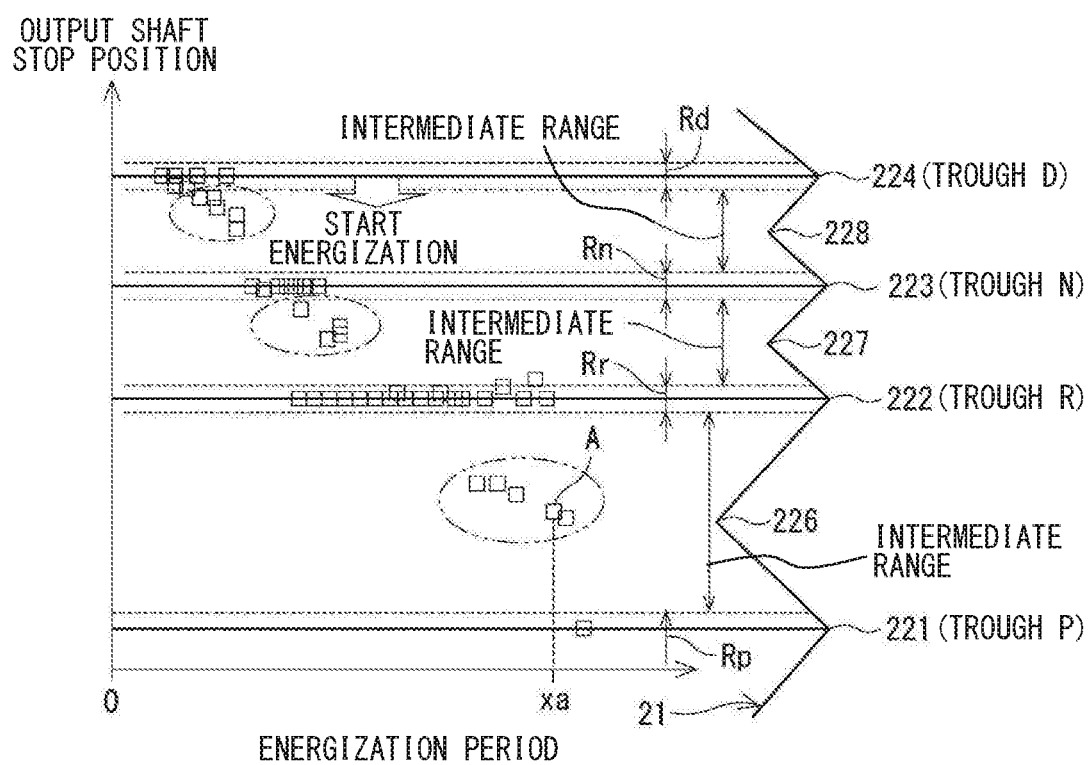
FIG. 6 is an illustrative diagram showing a relationship between an energization period and an output shaft stop position according to the first embodiment.

As shown in FIG. 6, a region Rp is a region on a side opposite to the R trough 222 by a predetermined position on the side of the R trough 222 from the center of the P trough 221, and is a P lock guarantee range in which a parking lock by the parking lock mechanism 30 is guaranteed when the detent roller 26 is at an output shaft angle in the region Rp. A region Rr is a predetermined range including the center of the R trough 222, and is an R hydraulic pressure generation range in which a hydraulic pressure in the R range is guaranteed in the automatic transmission 5 when the detent roller 26 is at the output shaft angle in the region Rr. A region Rd is a predetermined range including the center of the D trough 224, and is a D hydraulic pressure generation range in which a hydraulic pressure in the D range is guaranteed in the automatic transmission 5 when the detent roller 26 is at the output shaft angle in the region Rd. A region Rn is a predetermined range including the center of the N trough 223, and is a range in which a frictional engagement element (not shown) is not engaged, and no generation of an oil pressure is guaranteed in an oil passage of the automatic transmission 5 when the detent roller 26 is at the output shaft angle in the region Rn. Hereinafter, the regions Rp, Rr, Rn, and Rd are appropriately defined as range guarantee regions, and regions other than the range guarantee regions are defined as intermediate range regions.

As shown in FIG. 1, the parking lock mechanism 30 includes a parking rod 31, a conical body 32, a parking lock pawl 33, a shaft portion 34, and a parking gear 35. The parking rod 31 is formed in a substantially L-shape, and one end 311 is fixed to the detent plate 21. The conical body 32 is provided on the other end 312 side of the parking rod 31. A diameter of the conical body 32 decreases toward the other end 312. When the detent plate 21 swings in a reverse rotation direction, the conical body 32 moves in a direction of an arrow P.

The parking lock pawl 33 abuts against a conical surface of the conical body 32, and a projection portion 331 that can mesh with the parking gear 35 is provided on the parking gear 35 side of the parking lock pawl 33 that is provided so as to be swingable about the shaft portion 34. When the detent plate 21 rotates in the reverse rotation direction and the conical body 32 moves in a direction of an arrow P, the parking lock pawl 33 is pushed up, and the projection portion 331 and the parking gear 35 mesh with each other. On the other hand, when the detent plate 21 rotates in a forward rotational direction and the conical body 32 moves in a direction of an arrow notP, the engagement between the projection portion 331 and the parking gear 35 is released.

The parking gear 35 is provided on an axle (not shown) so as to be engageable with the projection portion 331 of the parking lock pawl 33. When the parking gear 35 and the projection portion 331 are engaged with each other, the rotation of the axle is restricted. When the shift range is a notP range other than the P, the parking gear 35 is not locked by the parking lock pawl 33, and the rotation of the axle is not hindered by the parking lock mechanism 30. When the shift range is the P range, the parking gear 35 is locked by the parking lock pawl 33, and the rotation of the axle is regulated.

As shown in FIGS. 2 and 3, the shift range control device 40 includes motor drivers 41 and 42 as drive circuits, an ECU 50 as a control unit, and the like. The motor driver 41 is a three-phase inverter for switching the energization of the first motor winding 11, and switching elements 411 to 416 are bridge-connected to each other One end of the U1 coil 111 is connected to a connection point of the U-phase switching elements 411 and 414 that are paired with each other. One end of the V1 coil 112 is connected to a connection point of the V-phase switching elements 412 and 415 that are paired with each other. One end of the W1 coil 113 is connected to a connection point of the W-phase switching elements 413 and 416 which are paired with each other. The other ends of the coils 111 to 113 are connected to each other by a connection portion 115.

The motor driver 42 is a three-phase inverter for switching the energization of the second motor winding 12, and switching elements 421 to 426 are bridge-connected to each other. One end of the U2 coil 121 is connected to a connection point of the U-phase switching elements 421 and 424 which are paired with each other. One end of the V2 coil 122 is connected to a connection point of the V-phase switching elements 422 and 425 that are paired with each other. One end of the W2 coil 123 is connected to a connection point of the W-phase switching elements 423 and 426 that are paired with each other. The other ends of the coils 121 to 123 are connected to each other by a connecting portion 125. The switching elements 411 to 416 and 421 to 426 according to the present embodiment are MOSFET, but other elements such as IGBT may be used.

A motor relay 46 is provided between the first motor driver 41 and the battery 45. A motor relay 47 is provided between the second motor driver 42 and the battery 45. The motor relays 46 and 47 are turned on when a start switch such as an ignition switch or the like is turned on, and an electric power is supplied to the motor 10. The motor relays 46 and 47 are turned off when the start switch is turned off, and the supply of electric power to the motor 10 is cut off. A voltage sensor 48 for detecting a battery voltage Vb is provided on a high potential side of the battery 45.

The ECU 50 controls on/off operations of the switching elements 411 to 416 and 421 to 426, and controls driving of the motor 10, thereby controlling switching of the shift range. The ECU 50 controls the driving of a shift hydraulic control solenoid 6 based on a vehicle speed, an accelerator opening degree, a driver requested shift range, and the like. A shift stage is controlled by controlling the shift hydraulic control solenoid 6. The number of shift hydraulic control solenoids 6 corresponding to the number of shift stages and the like is provided. In the present embodiment, one ECU 50 controls the driving of the motor 10 and the solenoid 6, but the ECU 50 may be separated into a motor ECU for controlling the motor 10 and an AT-ECU for controlling the solenoid. Hereinafter, the drive control of the motor 10 will be mainly described.

The ECU 50 includes microcomputers 51 and 52, and the like, and internally includes a CPU (not shown), a ROM, a RAM, an I/O, a bus line for connecting those components, and the like. The processing in the ECU 50 may be software processing by allowing a CPU to execute a program stored in advance in a tangible memory device such as a ROM (that is, a readable non-transitory tangible recording medium), or hardware processing by dedicated electronic circuits.

Figure 9:
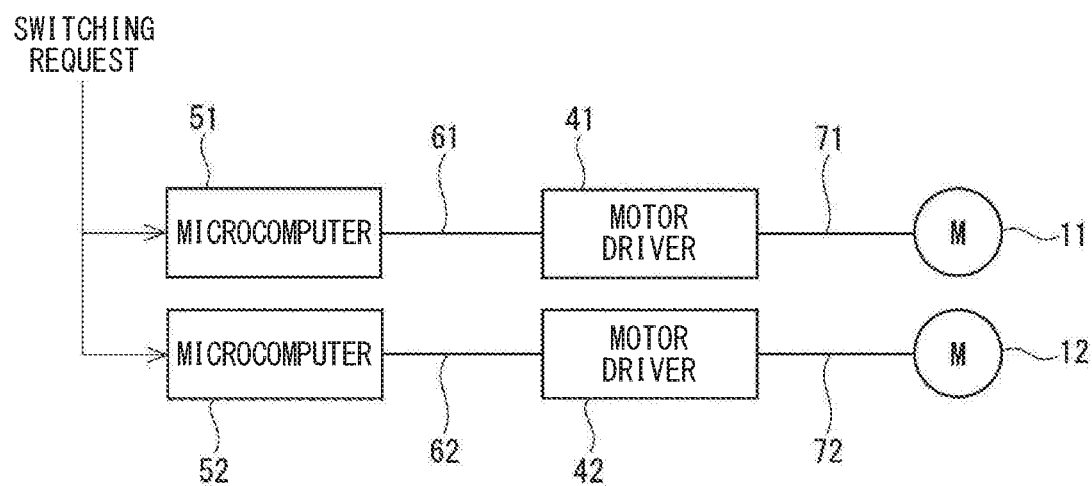
FIG. 9 is a schematic diagram showing a motor drive control system according to the first embodiment.

As shown in FIGS. 2 and 9, the first microcomputer 51 is connected to the first motor driver 41 and controls the energization of the first motor winding 11. In the second microcomputer 52, the second microcomputer 52 is connected to the second motor driver 42 and controls the energization of the second motor winding 12. The microcomputers 51 and 52 perform a calculation relating to the drive control of the motor 10, and correspond to a "calculation unit".

The microcomputers 51 and 52 control the driving of the motor 10 by feedback control or the like based on a motor angle θm, an output shaft angle θs, and the like so that the motor angle θm stops at a motor angle target value θcmd set according to the requested shift range. The details of the drive control of the motor 10 may be any. The microcomputers 51 and 52 monitor the abnormality in the shift-by-wire system 1. In particular, in the present embodiment, the intermediate range stop abnormality in which the detent roller 26 stops in the intermediate range region is detected by the occurrence of the motor-off failure in which the motor 10 stops during the range switching.

Figure 4:
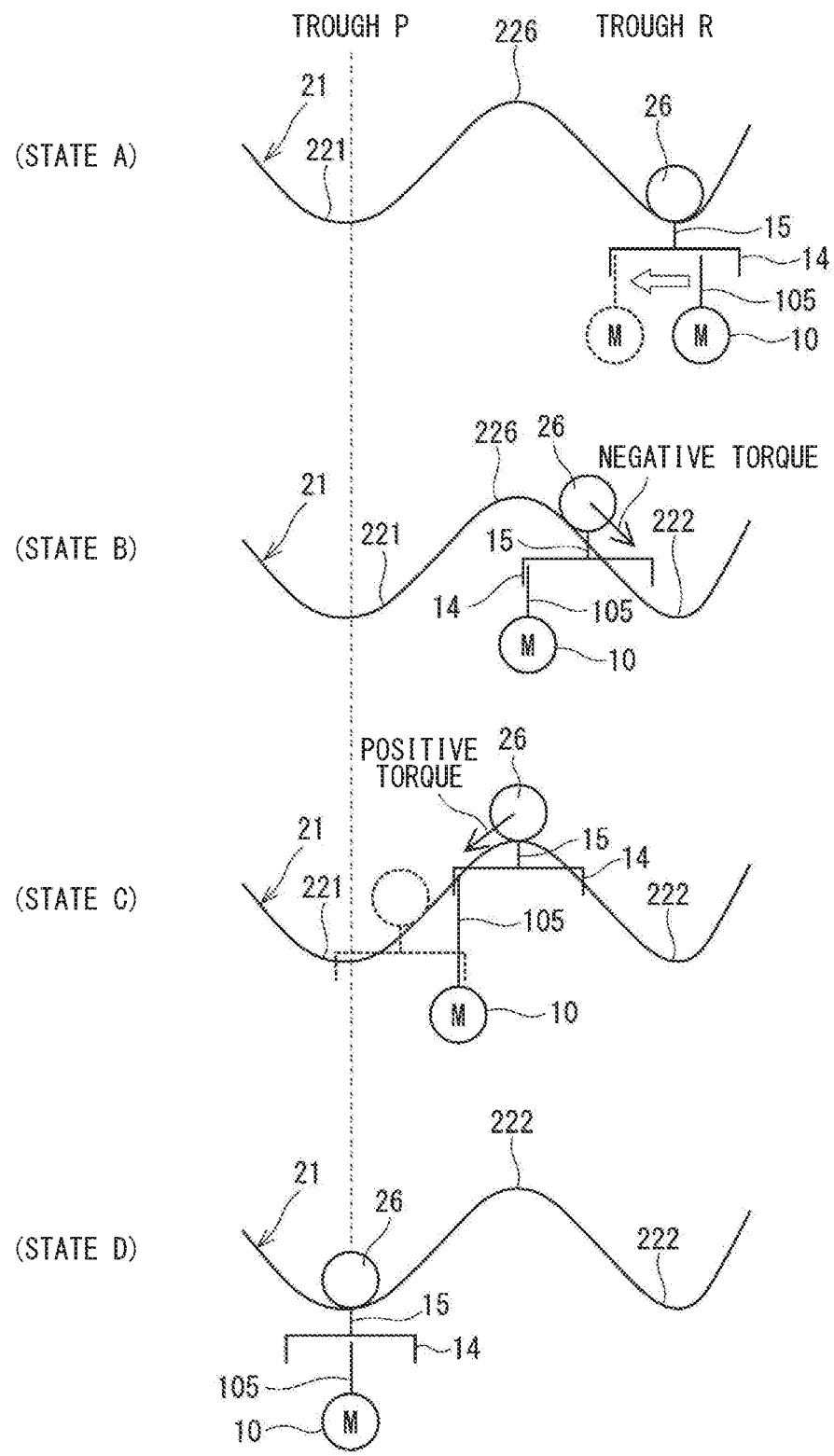
FIG. 4 is an illustrative diagram illustrating the behavior of a detent mechanism according to the first embodiment.

In this example, the behavior of the detent mechanism at the time of shift range switching will be described with reference to FIG. 4. In FIG. 4, the concept of "allowance" is schematically shown, and the output shaft 15 and the speed reducer 14 are integrated with each other, and the motor shaft 105 is movable within an allowance range of the speed reducer 14. The motor shaft 105 and the speed reducer 14 may be integrated with each other so that "allowance" exists between the speed reducer 14 and the output shaft 15. In this example, the "allowance" between the motor shaft 105 and the output shaft 15 will be described mainly with respect to an allowance existing between the gear of the speed reducer 14 and the motor shaft 105, but the "allowance" can be regarded as a total of allowance, backlash, and the like existing between the motor shaft 105 and the output shaft 15.

Hereinafter, an example in which the shift range is switched from a range other than the P range to the P range will be mainly described. FIG. 4 schematically shows a state in which the detent roller 26 moves from the R trough 222 to the P trough 221 as the motor 10 rotates. In FIG. 4, the rotation directions of the motor 10 and the output shaft 15 are described as right and left directions in the drawing, and a state in which the detent roller 26 moves along with the rotation of the motor 10 is shown from an upper stage to a lower stage. Actually, the detent plate 21 rotates integrally with the output shaft 15 to move the detent roller 26 between the troughs 221 to 224, but in FIG. 4, the detent roller 26 is illustrated as moving together with the output shaft 15 for the purpose of description.

Prior to the description of the behavior of the detent mechanism, a torque applied to the detent mechanism will be described with reference to FIG. 5. As shown in an upper part of FIG. 5, when the detent plate 21 is rotated, a state in which a load torque TL generated by a spring load SL of the detent spring 25 acts as a positive torque for assisting the drive torque of the motor 10 and a state in which the load torque TL acts as a negative torque for preventing the drive torque of the motor 10 are repeated. When switching the shift range in the P range direction, a torque applied to the detent roller 26 in the P direction is defined as a positive torque, and a torque applied in the D direction is defined as negative torque. The positive torque is generated mainly by the drive torque of the motor 10 and the spring load SL during the descending of the detent roller 26. The negative torque is generated mainly by the spring load SL during the ascending of the detent roller 26.

As shown in FIG. 4, in the shift-by-wire system 1, in the shift range switching mechanism 20, the shift range is switched by the detent roller 26 moving between the troughs 221 to 224 by the rotation of the detent plate 21. In the present embodiment, the detent roller 26 is dropped to any one of the troughs 221 to 224 corresponding to the requested shift range by the spring load SL by use of the backlash provided between the motor shaft 105 and the output shaft 15.

When the detent roller 26 is moved from the R trough 222 to the P trough 221, as shown in a state a, the motor 10 rotates in the backlash, so that the motor shaft 105 and the speed reducer 14 come into contact with each other, and the backlash is clogged. When the backlash is clogged, the motor shaft 105 and the output shaft 15 rotate integrally with each other, and the detent roller 26 starts ascending.

As shown in a state b, the motor 10 pulls the output shaft 15 when the detent roller 26 is in an ascending state in which the detent roller 26 moves from the R trough 222 to a crest 226. At that time, the spring load SL acts as a negative torque.

As shown in a state c, when the detent roller 26 is in a descending state of moving from an apex of the crest 226 to the P trough 221, the spring load SL acts as a positive torque, and the output shaft 15 precedes the motor 10, and is drawn into the P trough 221 in the backlash. As shown in a state d, the detent roller 26 falls into the P trough 221.

In the present embodiment, a DC motor having a permanent magnet is used as the motor 10, and as shown in a lower part of FIG. 5, the motor cogging torque TC_M is periodically generated. The generation cycle of the cogging torque differs depending on the number of magnetic poles of the motor 10 and the like. The motor cogging torque TC_M is amplified in accordance with a gear ratio of the speed reducer 14 and transmitted to the output shaft 15. Hereinafter, the cogging torque amplified by the speed reducer 14 is referred to as an output shaft cogging torque TC_S.

As indicated by "x" in FIG. 5, torque balance points at which the load torque TL and the output shaft cogging torque TC_S are balanced occur on the ascending side. In particular, when a gear ratio of the speed reducer 14 is large and a maximum value of the output shaft cogging torque TC_S is larger than a maximum value of the negative torque by the detent spring 25, the number of torque balance points is increased as compared with the case where the maximum value of the output shaft cogging torque TC_S is smaller than the maximum value of the negative torque. In order to avoid complication, parts of the marks "X" indicating the balance points are illustrated.

In this example, a case will be described in which a motor-off failure, which is an abnormality in which the motor 10 cannot be driven due to a disconnection or the like, occurs during the range switching. When the motor-off failure occurs during descending of the detent roller 26, the spring load SL acts as a positive torque, and therefore, if a large allowance is provided, the detent roller 26 can be dropped to a trough by the spring load SL.

On the other hand, when a motor-off failure occurs during ascending of the detent roller, the spring load SL acts as a negative torque. For that reason, when the motor-off failure occurs at the torque balance point, the detent roller 26 stops in the course of ascending, and a new problem of the intermediate range stop abnormality has been found (see FIG. 8). When the detent roller 26 stops at the torque balance point, the intermediate range stop abnormality is not resolved even if the backlash is large. Further, in the case of a motor which does not use a permanent magnet such as a switched reluctance motor, for example, a cogging torque is not generated, so that the torque balance point does not occur, and the detent roller 26 is dropped into any of the troughs 221 to 224 by the spring load SL of the detent spring 25, so that an intermediate range stop abnormality does not occur.

FIG. 6 shows a stop position of the output shaft 15 when the energization is turned off after a certain period of time elapses until the detent roller 26 reaches the P trough 221 after the energization is started from a state in which the detent roller 26 is in the D trough 224. Even if the energization is turned off during the range switching, the detent roller 26 is dropped into one of the troughs 221 to 224 by the spring load SL depending on an energization off timing. However, as surrounded by a two-dot chain line, when the energization is turned off during the ascending of the detent roller 26, the detent roller 26 may stop in an intermediate range region.

Figure 7:
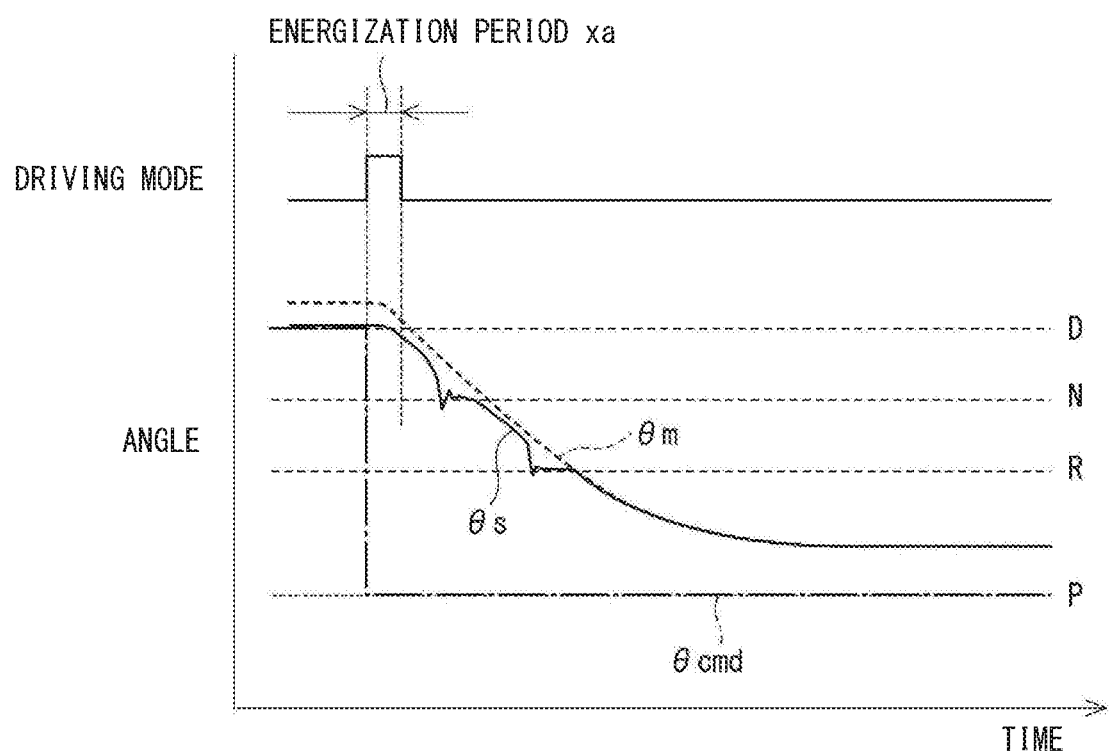
FIG. 7 is a time chart showing an experimental result in the case where an energization is turned off after the energization for a predetermined time according to the first embodiment.
Figure 8:
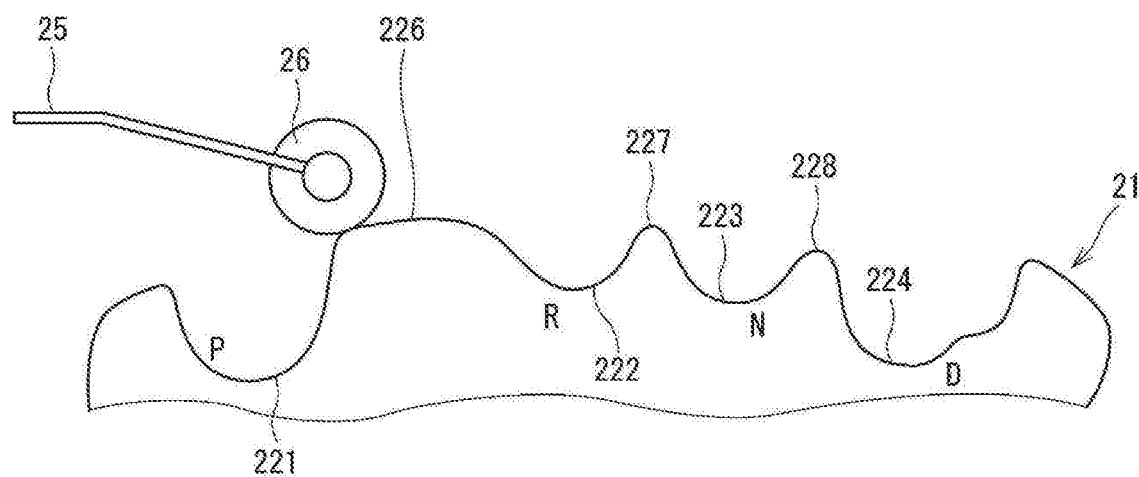
FIG. 8 is a schematic diagram showing a state in which an intermediate range stop abnormality has occurred according to the first embodiment.

FIGS. 7 and 8 are experimental results when an energization period of the motor 10 is defined as xa, and correspond to a point A in FIG. 6. In FIG. 7, a horizontal axis represents a common time axis, and a driving mode and an angle are shown from the top. P, R, N, and D in the figure correspond to the output shaft angles when the detent roller 26 is located at the centers of the troughs 221 to 224. The motor angle θm and the motor angle target value θcmd are described in terms of output shaft.

It is understood that when the detent roller 26 is energized for a time xa from a state in which the detent roller 26 is at the D trough 224 and then deenergized, the motor angle θm does not reach the motor angle target value θcmd, and the output shaft angle θs stops in an intermediate range region between the R trough 222 and the P trough 221.

If an abnormality occurs in which the output shaft 15 stops in the intermediate range region, the manual valve 28 stops at a halfway position, so that an appropriate hydraulic pressure cannot be generated, which may lead to a failure of the automatic transmission 5.

Therefore, in the present embodiment, the multiple motor drive control systems are systematized so that an intermediate range stop abnormality does not occur even when a disconnection or the like occurs in a part of the motor drive control systems. The motor drive control system includes the motor windings 11 and 12, the motor drivers 41 and 42, the microcomputers 51 and 52, and connection wirings for connecting those components to each other. The combination of the first motor winding 11, the first motor driver 41, the first microcomputer 51, and connection wirings 61 and 71 for connecting those components to each other is defined as a first system, and the combination of the second motor winding 12, the second motor driver 42, and the second microcomputer 52, and connection wirings 62 and 72 for connecting those components to each other is defined as a second system.

As shown in FIG. 9, the first motor driver 41 is connected to the first microcomputer 51 by the first microcomputer-side connection wiring 61, and is connected to the first motor winding 11 by the first motor-side connection wiring 71. The first microcomputer 51 controls the on/off operation of the switching elements 411 to 416 (not shown in FIG. 9) of the first motor driver 41, thereby controlling the energization of the first motor winding 11.

Figure 11:
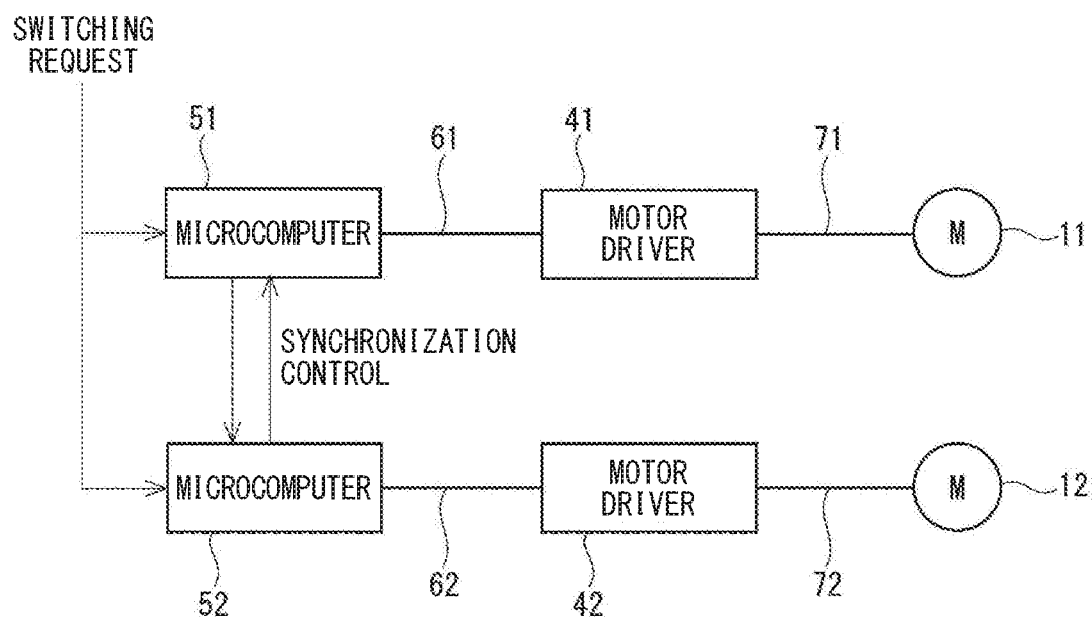
FIG. 11 is a schematic diagram showing a motor drive control system according to a second embodiment.

The second motor driver 42 is connected to the second microcomputer 52 by the second microcomputer-side connection wiring 62, and is connected to the second motor winding 12 by the second motor-side connection wiring 72. The second microcomputer 52 controls the on/off operation of the switching elements 421 to 426 (not shown in FIG. 9) of the second motor driver 42, thereby controlling the energization of the second motor winding 12. The range switching request and the like are input to the microcomputers 51 and 52, and perform various controls based on the input information. In FIGS. 9 and 11, the motor windings 11 and 12 are denoted by a symbol "M".

A motor control process according to the present embodiment will be described with reference to a flowchart of FIG. 10. This processing is executed by each of the microcomputers 51 and 52 at a predetermined cycle. In this example, the processing in the first microcomputer 51 is described, and the processing in the second microcomputer 52 is similar to the processing in the first microcomputer 51, and therefore a description of the processing in the second microcomputer 52 will be omitted. Hereinafter, a "Step" of Step S101 is omitted, and the symbol "S" is simply referred to. The same applies to the other steps. The same applies to the third to fifth embodiments.

In S101, the first microcomputer 51 determines whether or not a host system is normal. When it is determined that the host system is normal (YES in S101), the process shifts to S102 and the range switching is permitted. Specifically, in order to drive the motor 10 in accordance with the requested shift range, the energization of the first motor winding 11 is controlled. When it is determined that the host system is not normal (NO in S101), the process shifts to S103 and the range switching in the host system is prohibited. Specifically, the first motor winding 11 is not energized. At this time, if the other system is normal, the driving of the motor 10 is continued by use of the other system. In addition, in S104, the first microcomputer 51 notifies the second microcomputer 52 and other ECUs (not shown) outside the shift-by-wire system 1, such as a host ECU that controls the entire vehicle, of the information indicating that a failure has occurred in the first system. An information transmission between the microcomputers 51 and 52 may be performed directly by an inter-microcomputer communication, or may be performed through a vehicle communication network such as CAN (Controller Area Network).

As described above, the shift-by-wire system 1 according to the present embodiment includes the motor 10, the motor drivers 41 and 42, the output shaft 15, the shift range switching mechanism 20, and the ECU 50. The motor 10 has the motor windings 11 and 12, and a cogging torque is generated by permanent magnets. The motor drivers 41 and 42 switch the energization of the motor windings 11 and 12. The output shaft 15 is transmitted with the rotation of the motor shaft 105 which is a rotation shaft of the motor 10.

The shift range switching mechanism 20 includes the detent plate 21, the detent roller 26, and the detent spring 25. The detent plate 21 is formed with the multiple troughs 221 to 224 and the multiple crests 226 to 228 separating the troughs 221 to 224, and rotates integrally with the output shaft 15. The detent roller 26 fits in any one of the troughs 221 to 224 corresponding to the shift range. The detent spring 25 urges the detent roller 26 in a direction of fitting into the troughs 221 to 224. The ECU 50 includes microcomputers 51 and 52 for performing a calculation relating to drive control of the motor 10.

An allowance is provided between the motor shaft 105 and the output shaft 15, and the detent roller 26 can be dropped into the troughs 221 to 224 by use of the allowance. The motor drivers 41 and 42, the motor windings 11 and 12, the connection wirings 71 and 72 connecting the motor drivers 41 and 42 and the motor windings 11 and 12, respectively, and the microcomputers 51 and 52 are defined as a motor drive control system. The multiple motor drive control systems are provided so as to avoid the occurrence of an intermediate range stop abnormality in which the output shaft 15 stops due to the balance of an output shaft cogging torque, which is a cogging torque transmitted to the output shaft 15, and a torque including a load torque by the detent spring 25, when an abnormality occurs in the motor drive control system during ascending in which the detent roller 26 is moving from the troughs 221 to 224 to the crests 226 to 228. As a result, even when an abnormality occurs in the motor drive control system during ascending of the detent roller 26, the driving of the motor 10 can be continued, and the intermediate range stop abnormality is avoided, so that a failure of the automatic transmission 5 can be prevented.

The respective microcomputers 51 and 52 independently control the energization of the respective motor windings 11 and 12 in response to a common range switching request. As a result, the motor 10 can be driven by use of the multiple systems simultaneously, and an output can be secured. Even when an abnormality occurs in a part of the systems, the motor 10 can be driven as it is in the normal system and the range switching can be continued.

When an abnormality occurs in a part of the motor drive control systems, the driving of the motor 10 is continued by use of the motor drive control system that is normal. As a result, even when an abnormality occurs in a part of the systems, the range switching can be continued.

When an abnormality occurs in the motor drive control system, the first microcomputer 51 notifies at least one of the second microcomputer 52, which is the "other calculation unit", and the outside of the system of information indicating that an abnormality has occurred. This makes it possible to take a measure corresponding to the abnormal state. In addition, for example, the driver is notified of an abnormality, thereby being capable of prompting an early repair.

Second Embodiment

A second embodiment is shown in FIG. 11. As shown in FIG. 11, in the present embodiment, microcomputers 51 and 52 perform a synchronization control for matching control timings. In the present embodiment, clock signals of the respective microcomputers 51 and 52 are synchronized with each other. The synchronization control may be performed by sharing synchronization information between the microcomputers 51 and 52, or information such as external clocks from the outside of the microcomputers 51 and 52 may be used.

In the present embodiment, the microcomputers 51 and 52 perform the synchronization process for synchronizing the timing of the energization instruction with the other microcomputers 52 and 51. This makes it possible to reduce a deviation of the energization timing between the motor windings 11 and 12. This can prevent a torque from decreasing due to the deviation of the energization timing. In addition, the same effects as those of the above embodiment can be obtained.

Third Embodiment

Figure 12:
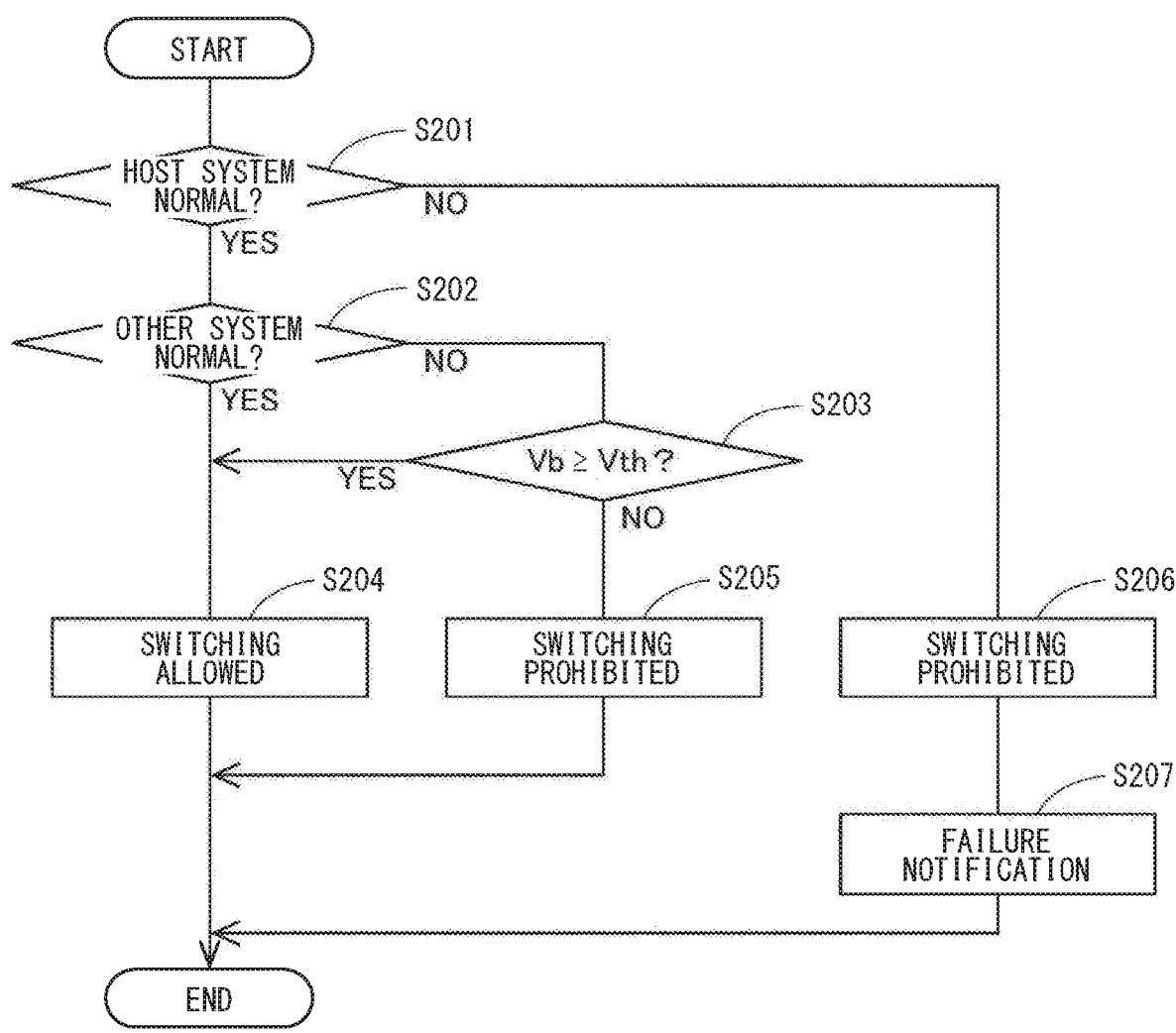
FIG. 12 is a flowchart illustrating a motor control process according to a third embodiment.

A third embodiment is shown in FIG. 12. In third to fifth embodiments, a motor control process is performed as in the first embodiment, and therefore the motor control process will be mainly described. As in the second embodiment, a synchronization control may be performed.

Figure 10:
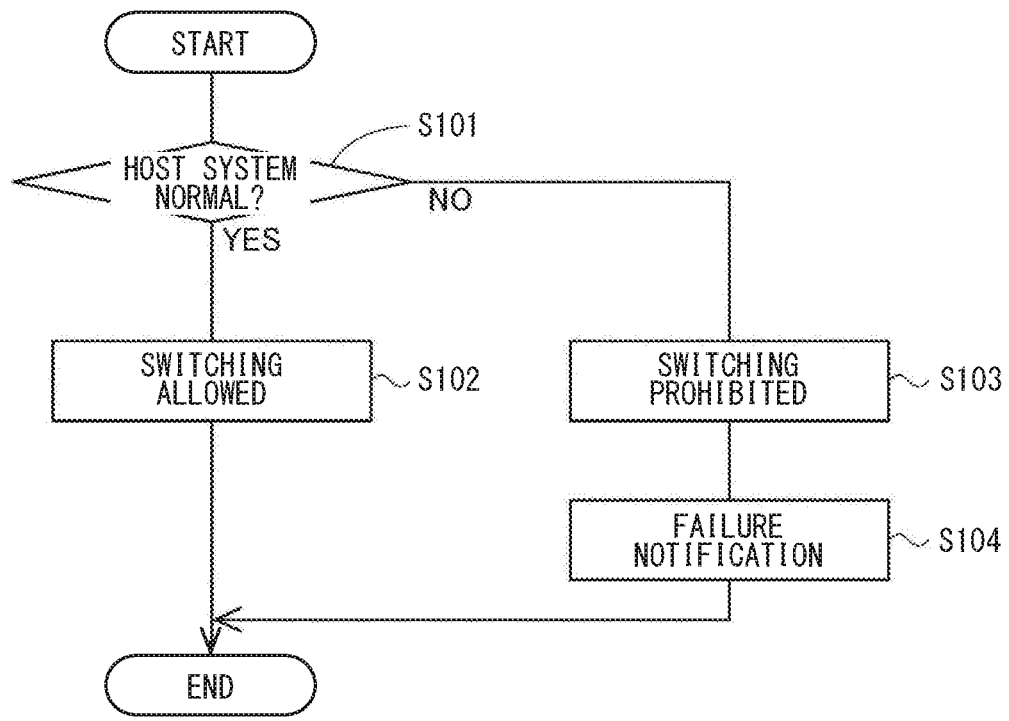
FIG. 10 is a flowchart illustrating a motor control process according to the first embodiment.

In S201, as in S101 of FIG. 10, the first microcomputer 51 determines whether or not a host system is normal. When it is determined that the host system is not normal (NO in S201), the process shifts to S206. The processes of S206 and S207 are the same as the processes of S103 and S104 in FIG. 10. If it is determined that the host system is normal (YES in S201), the process shifts to S202.

In S202, the first microcomputer 51 determines whether or not the other system is normal. When it is determined that the other system is normal (YES in S202), the process shifts to S204 and the range switching is permitted. When it is determined that the other system is not normal (NO in S202), the process shifts to S203.

In S203, the first microcomputer 51 determines whether or not a battery voltage Vb is equal to or higher than a voltage determination threshold Vth. In the present embodiment, the battery voltage Vb corresponds to "an input voltage input to the drive circuit". The voltage determination threshold Vth is set to a voltage that can drive the motor 10 in one system. The voltage determined threshold Vth may be the same value regardless of the range, or may be a different value depending on the current shift range, for example, when the current shift range is the P range, the voltage determination threshold Vth may be set to a value larger than that when the current shift range is the other range, or the like. When it is determined that the battery voltage Vb is equal to or higher than the voltage determination threshold Vth (YES in S203), the process shifts to S204 and the range switching is permitted. When it is determined that the battery voltage Vb is less than the voltage determination threshold Vth (NO in S203), the process shifts to S205 and the range switching is prohibited.

When the motor 10 is driven by one system, a torque that can be output is lowered as compared with the case of driving by two systems. In addition, if the battery voltage is lowered, the outputtable torque is further lowered, and the range switching may fail. Therefore, in the present embodiment, when an abnormality occurs in one of the systems and the battery voltage Vb is lowered, switching of the shift range is prohibited. This makes it possible to prevent the range switching failure caused by the torque reduction.

In the present embodiment, when an abnormality occurs in a part of the motor drive control systems, the range switching execution determination is performed to select the permission or prohibition of the range switching. Specifically, the ECU 50 performs the determination on the battery voltage Vb as the input voltage input to the motor drivers 41 and 42 as the range switching execution determination, permits the range switching when the battery voltage Vb is equal to or higher than the voltage determination threshold Vth, and prohibits the range switching when the battery voltage Vb is less than the voltage determination threshold Vth. As a result, the range switching failure due to a torque shortage caused by a failure of a part of the systems can be prevented, and the occurrence of the intermediate range stop abnormality can be avoided. In addition, the same effects as those of the above embodiment can be obtained.

Fourth Embodiment

Figure 13:
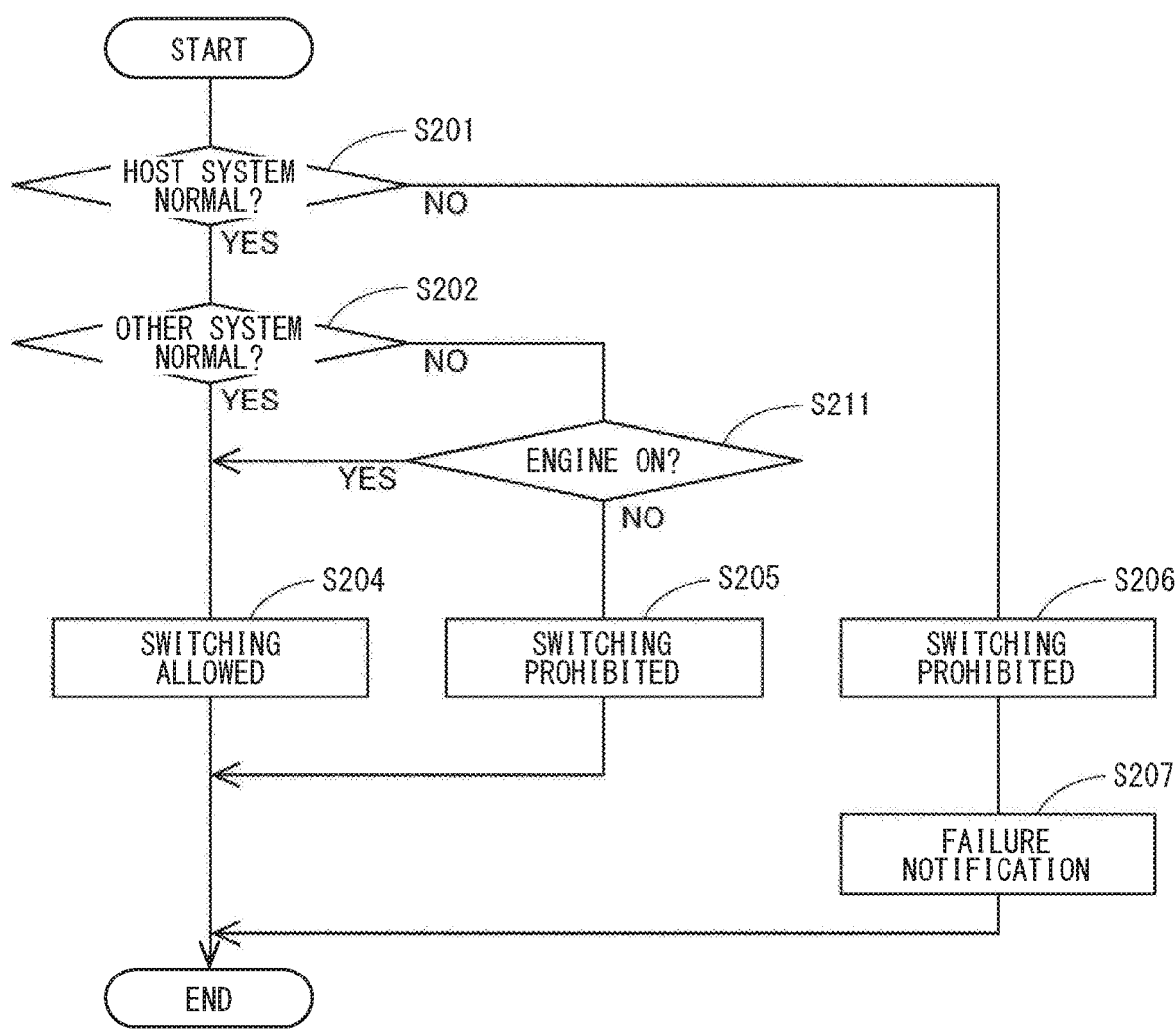
FIG. 13 is a flowchart illustrating a motor control process according to a fourth embodiment.

A fourth embodiment is shown in FIG. 13. A motor control process according to the present embodiment is the same as that of the third embodiment except that the process in S211 is performed instead of S203 in FIG. 12. In S211 to which the process proceeds when a negative determination is made in S202, a first microcomputer 51 determines whether or not an engine is being driven. When it is determined that the engine is being driven (YES in S211), the process shifts to S204 and the range switching is permitted. When it is determined that the engine is not being driven (NO in S211), the process shifts to S205 and the range switching is prohibited.

In the present embodiment, an ECU 50 determines a driving state of the engine as a range switching execution determination. When the engine is being driven, the range switching is permitted, and when the engine is being stopped, the range switching is prohibited. For example, when the engine is stopped due to an idle stop or the like, the battery voltage Vb may be lowered. Therefore, in the present embodiment, when an abnormality occurs in one of the systems and the engine is stopped, the shift range is prohibited from being switched. As a result, the range switching failure due to the torque shortage can be prevented, and the occurrence of the intermediate range stop abnormality can be avoided. In addition, the same effects as those of the above embodiment can be obtained.

Fifth Embodiment

Figure 14:
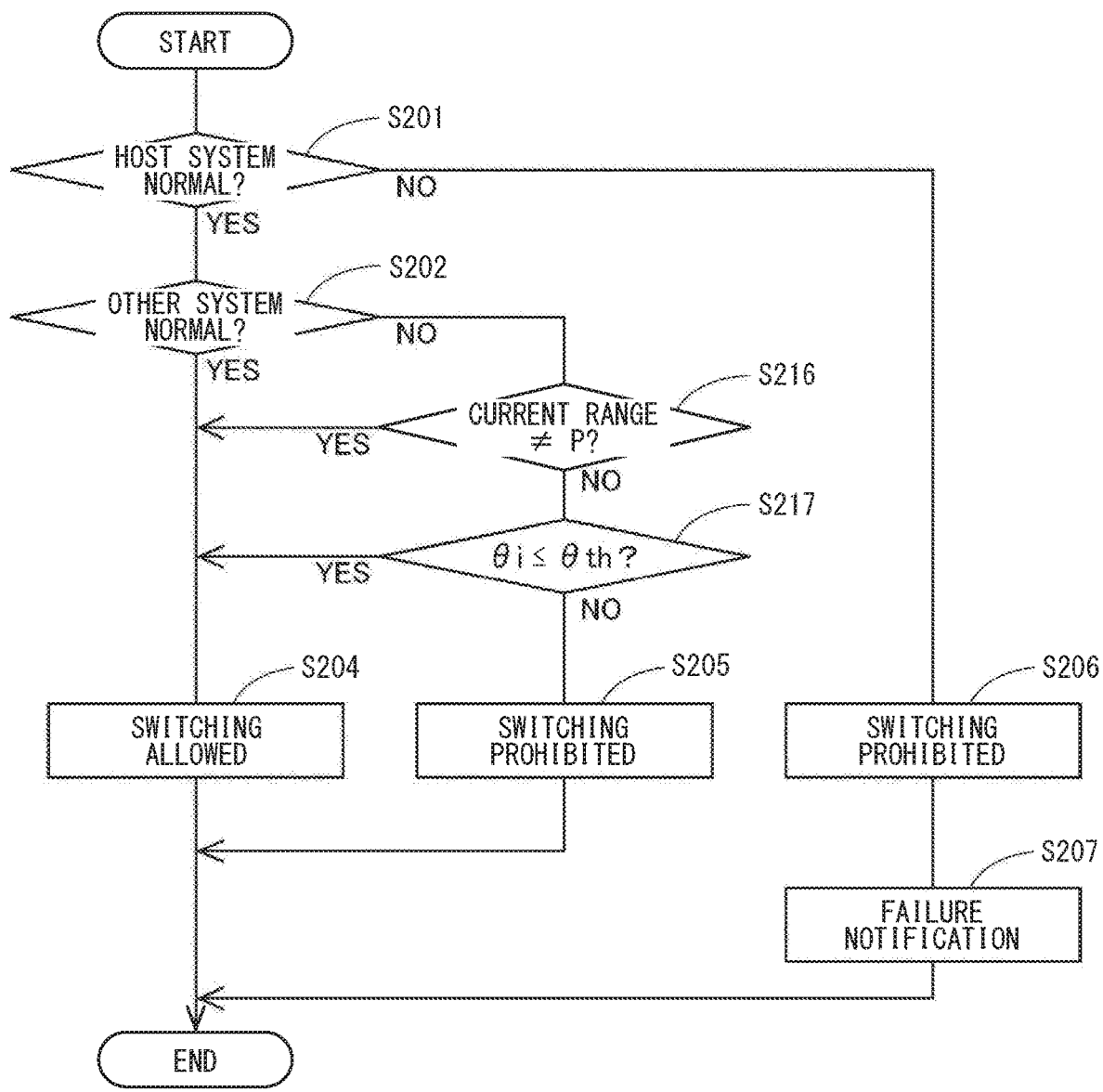
FIG. 14 is a flowchart illustrating a motor control process according to a fifth embodiment.

A fifth embodiment is shown in FIG. 14. A motor control process according to the present embodiment is the same as that of the third embodiment except that processes of S216 and S217 are performed instead of S203 in FIG. 12. In S216 to which the process proceeds when a negative determination is made in S202, a first microcomputer 51 determines whether or not a current shift range is other than a P range. When it is determined that the current shift range is other than the P range (YES in S216), the process shifts to S204 and the range switching is permitted. When it is determined that the current shift range is the P range (NO in S216), the process proceeds to S217.

In S217, the first microcomputer 51 determines whether or not an inclination angle θi of a vehicle is equal to or less than an angle determination threshold θth. The inclination angle θi of the vehicle is calculated based on, for example, a detection value of an inclination angle sensor. When it is determined that the inclination angle θi is equal to or smaller than the angle determination threshold θth (YES in S217), the process shifts to S204 and the range switching is permitted. When it is determined that the inclination angle θi is larger than the angle determination threshold θth (NO in S217), the process shifts to S205 and the range switching is prohibited.

When the shift range is switched from the P range to a range other than the P range, that is, at the time of "shifting from P", a torque larger than that at the time of switching the other ranges is required. Further, when the vehicle is inclined, a friction corresponding to the inclination angle θi and a vehicle weight is generated at a meshing point between the parking lock pawl 33 and the parking gear 35, and therefore, a larger torque is required at the time of shifting from P. Therefore, in the present embodiment, when an abnormality occurs in one of the systems and the range is shifted from P in a vehicle inclined state, the shift range is prohibited from being switched. This makes it possible to prevent the range switching failure caused by the torque reduction.

In the motor control process, the process of S217 may be omitted, and when an anomaly occurs in one of the systems, switching from the P range to another range may be prohibited regardless of the inclination angle θi of the vehicle. In the motor control process, multiple processes of S203 in FIG. 12, S211 in FIG. 13, and S216 and S217 in FIG. 14 may be combined together.

In the present embodiment, the ECU 50 determines the current shift range as the range switching execution determination. When the current shift range is other than the P range, range switching is permitted, and when the current shift range is the P range, the range switching is prohibited. Further, the ECU 50 determines the current shift range and the inclination angle θi of the vehicle as the range switching execution determination. When the current shift range is other than the P range, and when the current shift range is the P range and the inclination angle θi is equal to or less than the angle determination threshold θth, the range switching is permitted. When the current shift range is the P range and the inclination angle θi is larger than the angle determination threshold θth, the range switching is prohibited. This makes it possible to prevent the range switching failure caused by a torque shortage and to avoid the occurrence of the intermediate range stop abnormality at the time of shifting from P, which requires a relatively large torque. In addition, the same effects as those of the above embodiment can be obtained.

Other Embodiments

In the above embodiments, the motor is a DC brushless motor. In other embodiments, the motor may be other than a DC brushless motor that generates a cogging torque. In the above embodiments, the motor driver as the drive circuit is a three-phase inverter. In other embodiments, the drive circuit may be configured by being capable of switching the energization of the motor windings. In the above embodiment, two motor drive control systems are provided. In another embodiment, three or more motor drive control systems may be provided.

In the above embodiments, the motor rotation angle sensor is an encoder. In other embodiments, the motor rotation angle sensor is not limited to the encoder, and any type such as a resolver may be used. In the above embodiments, a potentiometer is exemplified as the output shaft sensor. In other embodiments, the output shaft sensor may be any sensor, for example, the output shaft sensor may be configured by a switch that is turned on in each range guarantee region, or a contactless magnetic sensor may be used. The output shaft sensor may be omitted.

In the above embodiments, the detent plate is provided with four troughs. In other embodiments, the number of troughs is not limited to four and may be any number. For example, two troughs corresponding to a P range and a notP range other than the P range may be provided. The shift range switching mechanism, the parking lock mechanism, and the like may be different from those of the above embodiments.

In the above embodiments, the speed reducer is provided between the motor shaft and the output shaft. Although the details of the speed reducer are not mentioned in the above embodiments, any configuration may be adopted, for example, a cycloid gear, a planetary gear, a spur gear for transmitting a torque from a speed reduction mechanism substantially coaxial with the motor shaft to the drive shaft, or a combination of those components may be employed. In other embodiments, the speed reducer between the motor shaft and the output shaft may be omitted, or a mechanism other than the speed reducer may be provided. As described above, the present disclosure is not limited to the above-described embodiments, and can be implemented in various forms without departing from the spirit of the present disclosure.

What is claimed is:

1. A shift range switching system, comprising:
a motor that includes a plurality of motor windings and generates a cogging torque by a permanent magnet;
a plurality of drive circuits that switch energization of the motor windings;
an output shaft to which rotation of a motor shaft as a rotation shaft of the motor is transmitted;
a shift range switching mechanism that includes a trough providing member having a plurality of troughs and a plurality of crests separating the troughs from each other, and integrally rotates with the output shaft, an engagement member that fits in one of the troughs corresponding to a shift range, and an urging member that urges the engagement member in a direction of fitting into one of the troughs; and
a control unit that includes at least one calculation unit for performing a calculation related to a drive control of the motor, wherein:
an allowance is provided between the motor shaft and the output shaft;
the engagement member drops into the one of the troughs with the allowance;
the drive circuits, the motor windings, and a plurality connection wirings connecting the drive circuits and the motor windings are defined as a plurality of motor drive control systems;
the cogging torque transmitted to the output shaft is defined as an output shaft cogging torque;

an intermediate range stop abnormality is defined that the output shaft stops when balancing the output shaft cogging torque and a torque including a load torque of the urging member; and when an abnormality occurs in the motor drive systems in an ascending action in which the engagement member moves from one of the troughs toward an adjacent one of the crests, the shift range switching systems avoids an occurrence of the intermediate range stop abnormality.

2. The shift range switching system according to claim 1, wherein:
a plurality of calculation units included in the at least one calculation unit independently and respectively control the energization of the motor windings in response to a common range switching request.

3. The shift range switching system according to claim 1, wherein:
one of a plurality of calculation units included in the at least one calculation unit performs a synchronization process for synchronizing an energization instruction timing with another one of the calculation units.

4. The shift range switching system according to claim 1, wherein:
when an abnormality occurs in a part of the motor drive control systems, a normal one of the motor drive control systems continues to provide driving the motor.

5. The shift range switching system according to claim 4, wherein:
when an abnormality occurs in a part of the motor drive control systems, a range switching execution determination is performed, and one of permission and prohibition of a range switching operation is selected.

6. The shift range switching system according to claim 5, wherein:
the control unit checks an input voltage to be input into the drive circuits as the range switching execution determination;
the control unit permits the range switching operation when the input voltage is equal to or higher than a voltage determination threshold; and
the control unit prohibits the range switching operation when the input voltage is less than the voltage determination threshold.

7. The shift range switching system according to claim 5, wherein:
the control unit checks a driving state of an engine as the range switching execution determination;
the control unit permits the range switching operation when the engine is running; and
the control unit prohibits the range switching operation when the engine stops running.

8. The shift range switching system according to claim 5, wherein:
the control unit checks a current shift range as the range switching execution determination;
the control unit permits the range switching operation when the current shift range is other than a P range; and
the control unit prohibits the range switching operation when the current shift range is the P range.

9. The shift range switching system according to claim 5, wherein:
the control unit checks the current shift range and an inclination angle of a vehicle as the range switching execution determination;
the control unit permits the range switching operation when the current shift range is other than the P range or when the current shift range is the P range and the inclination angle is equal to or less than an angle determination threshold; and
the control unit prohibits the range switching operation when the current shift range is the P range and the inclination angle is larger than the angle determination threshold.

10. The shift range switching system according to claim 1, wherein:
when the abnormality occurs in the motor drive systems, the at least one calculation unit notifies information indicating that the abnormality occurs to an outside.

* * * * *